April 24, 1934.     H. D. ELSE     1,956,417
CLUTCH MECHANISM
Filed March 7, 1930     2 Sheets-Sheet 1

INVENTOR
Harry D. Else.
BY
ATTORNEY

April 24, 1934.  H. D. ELSE  1,956,417
CLUTCH MECHANISM
Filed March 7, 1930  2 Sheets-Sheet 2

INVENTOR
Harry D. Else.
BY
ATTORNEY

Patented Apr. 24, 1934

1,956,417

UNITED STATES PATENT OFFICE 1,956,417

CLUTCH MECHANISM

Harry D. Else, Springfield, Mass., assignor to Westinghouse Electric & Manufacturing Company, a corporation of Pennsylvania Application March 7, 1930, Serial No. 433,930

18 Claims. (Cl. 192—105)

My invention relates broadly to motor drive mechanisms and, in its more specific aspect, to mechanisms which will permit a motor designed to carry a normal load to carry also an abnormal load and, when an electric motor is employed, will so operate without excessive increase in current flow over the current drawn during the normal running of the motor.

In the operation of driven loads, such as washing machines, wringers, compressors, or the like, abnormal loads, that is, loads greater than those normally encountered during running, may be thrown upon the driving means, as in accelerating the load from rest, or, when the load increases while running at normal speed, for example, when an abnormally thick wad of clothes is suddenly encountered by a wringer.

To design the driving means to drive abnormal loads with a steady or continuous torque, which is the conventional method, rather than to design it with reference to the normal load, is not only uneconomical, but, in the case of a conventional electric motor drive designed for use on domestic lighting circuits, is objectionable for the reason that upwards of 30 amperes or more are frequently required to start and accelerate loads. Lighting circuits are usually protected by 15-ampere fuses and power companies are adverse to more excessive demands being placed upon domestic lighting circuits.

By my invention, I am able to drive the abnormal loads with a motor designed for, and without excessive increase in the current required by, the normal load. This I accomplish by causing the motor to drive abnormal loads by jerks or impulsive torques rather than by a steady torque. To this end I conveniently employ, between my motor and the load, a power-transmitting mechanism which permits the motor to approach normal running speed before the load is engaged but which, upon reaching such speed, automatically makes a sudden or impulsive engagement with the load, imparting thereto a jerk or kick due to the transfer of kinetic energy from the rotor, which transfer suddenly slows the latter. When the rotor slows to a point where the current would excessively increase, the power-transmitting mechanism releases the load, permitting the rotor to again speed up, when the operation is repeated. Thus, a succession of impulsive blows is imparted by the rotor to the load until the latter acquires the desired speed, whereupon it remains connected to the rotor. Should, however, the load thereafter be abnormally increased, the rotor will again slow down and the operations above described will be repeated until the load is again brought up to normal speed. My power-transmitting mechanism, therefore, serves essentially as a variable-speed transmission automatically responsive to the rotational resistance offered by the load to impart thereto a speed substantially inversely proportional to the value of said resistance.

An important object of my invention, therefore, is to provide an efficient driving mechanism particularly suitable for starting machines, or devices to be driven, under load.

A further object of my invention is to provide such mechanism adapted to permit the driving device to attain a speed approaching running speed before becoming operatively engaged to the driven device, and, when the driving device is an electric motor, to accelerate the load without excessive increase in the motor current over the current drawn during normal running.

These and other objects of my invention will be apparent from the foregoing statement of the nature of the invention and from the following description taken in conjunction with the drawings.

Although my driving mechanism may be applied to any device which is to be started under load, it is particularly applicable for coupling the rotor of an electric motor to the machine to be driven and I have shown the device utilized in this connection.

Referring to the drawings, in which like figures indicate like parts,

In practicing my invention, in order to permit the driving machine to attain running speed, I provide centrifugally actuable means adapted to engage the driven member of the transmission mechanism when the driving device has reached a certain speed. This is accomplished by the utilization of spring-restrained weights which are adapted to fly outwardly to engage the driven member. In order to furnish the high momentary torque, I provide a device which, by reason of its construction, furnishes a pulsating or "bumping" torque.

Figure 1:
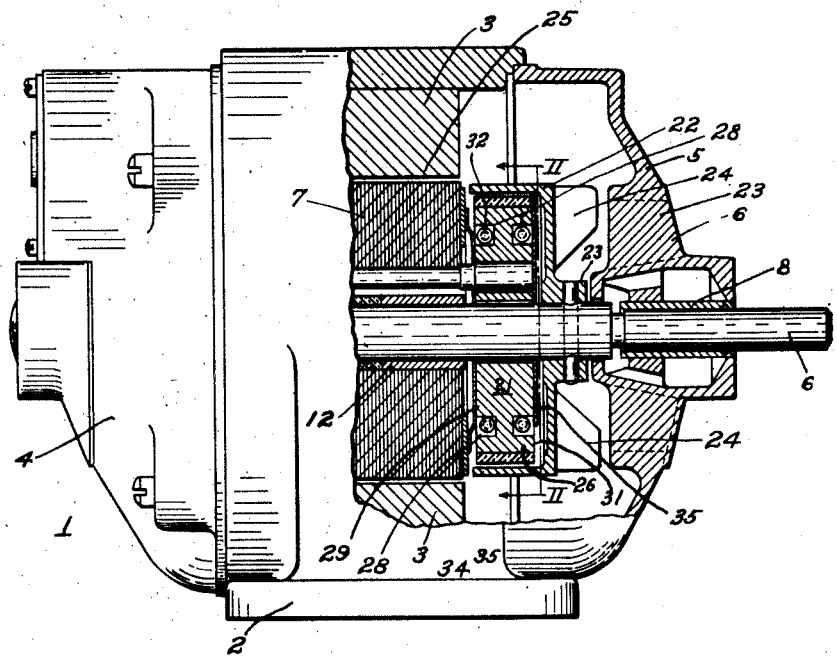
Figure 1 is a view, partly in elevation and partly in section, of an electric motor embodying the features of my driving mechanism.
Figure 2:
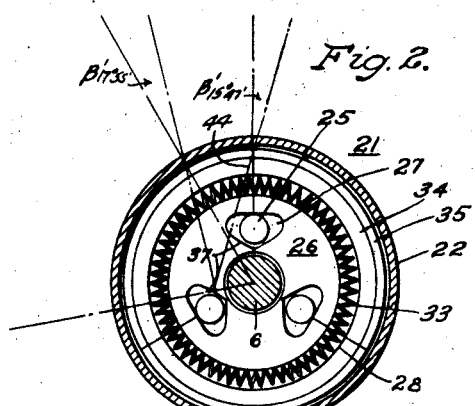
Fig. 2 is a sectional view of the driving mechanism in its disengaged position, taken along the line II—II of Fig. 1.
Figure 3:
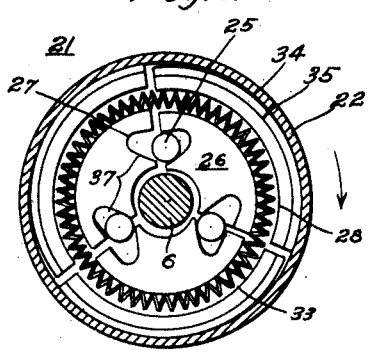
Fig. 3 is a sectional view of the driving mechanism shown in Figs. 1 and 2, but with its parts in engagement or driving position with regard to the bell, or driven device.

Referring to Figs. 1, 2 and 3, my construction may comprise a self-starting electric motor 1, the particular motor shown being a squirrel-cage motor, including a frame 2 to which are attached the field windings 3, and which is covered by means of end-bells 4 and 5. A shaft 6, on which is mounted the rotor 7, is rotatably mounted in the end-bells by means of sleeve bearings 8. The rotor 7 is rotatably mounted upon the shaft 6 by means of a sleeve bearing 12 and is adapted to be connected with the shaft of the motor by means of the transmission mechanism 21 hereinafter described.

A cup-shaped bell, or drum 22 is fastened to the shaft in any desired manner, as by means of a pin 23. The bell is preferably provided with a plurality of fins 24 on its outer face to assist in cooling the motor and the coupling mechanism.

A plurality of pins 25, which, preferably, are three in number, are carried by the core of the rotor 7 and are located with their longitudinal axes parallel to the axis of rotation of the rotor.

Segmental weights 26 (Figs. 2 and 3) are provided which are adapted to engage each other and to engage the pins 25 when the rotor is at rest. Notches 27 are provided in the straight-line edges of each of the weights. The angles at which these notches are cut are particularly important, as will be hereinafter explained. Annularly curved recesses 28 are provided in the end faces 29 and 31 of the segmental weights, and garter springs 32 and 33 are disposed within these recesses, under a condition of predetermined initial tension, to bias the weights radially inward to their inactive positions. The peripheral faces 34 of the weights are preferably covered with matted fibrous material or a moulded composition 35, such as is ordinarily utilized for brake linings and the like. As will be explained more in detail later on, this moulded matted fibrous friction-material has a coefficient of friction against cold metal which is preferably approximately .3 to .4.

Figure 4:
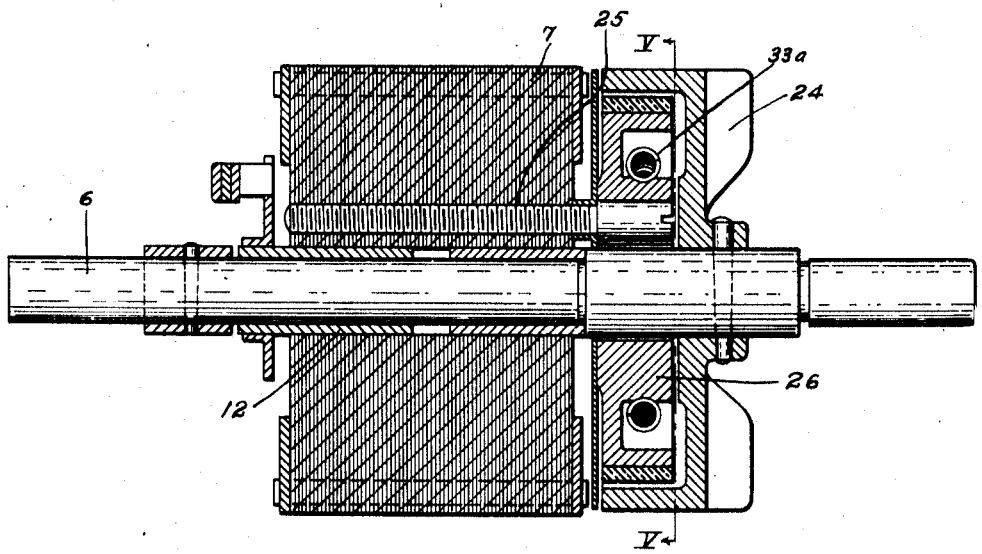
Fig. 4 is a sectional view of the rotor of a motor to which another embodiment of my mechanism has been attached.

The transmission mechanism shown in Fig. 4 is substantially the same as that shown in Figs. 1, 2 and 3 except that only one circular recess is provided and only one garter spring 33a is utilized. The two devices operate in substantially the same way except that, by the utilization of two garter springs, additional advantages are gained, such as elimination of the tendency of the weights to turn sideways because of unbalanced centrifugal force.

In operation, upon closing the switch which energizes the electric circuits of the motor, the rotor begins to revolve about the shaft 6 and, since the weights 26 are biased inwardly toward the center by the two garter springs, the rotor and weights are permitted to attain a speed within the running range. After a certain speed has been attained, the centrifugal force of the weights will overcome the tension of the garter springs and will cause the weights to fly radially outward. As soon as the weights come into contact with the inner surface of the bell, they rock on this surface by reason of their frictional engagement therewith and the driving pins 25 engage the rear sloping inner faces 37 of the notches 27, causing the rear ends of the weights to slide inwardly to a position such as shown in Fig. 3 with the forward or leading portions of the contacting surfaces in engagement with the bell.

If the resistance or static friction of the driven machine is substantial, the rotor will be slowed down slightly and the contacts between the weights and the bell will be momentarily broken, but, after a second speeding up of the rotor, the weights will again become engaged with the bell. This action will be repeated to impart a succession of percussive impulses or blows to the bell until the driven machine is "broken loose" from its static condition and attains running speed equal to that of the rotor, at which time the weights become firmly engaged with the bell or drum. Inasmuch as the speed of the rotor is not materially retarded during starting of the driven machine, the current will not greatly exceed that of normal running conditions.

Figure 8:
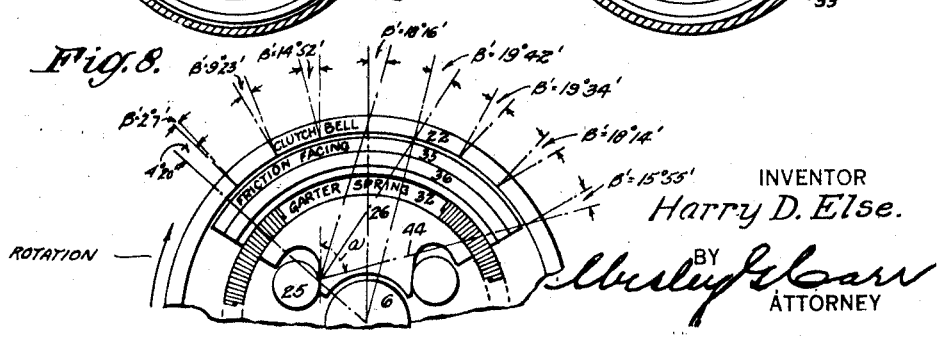
Fig. 8 is a diagrammatic end view illustrating the operation of the weights in a design having a slightly different radial spacing of the driving pins.
Figure 5:
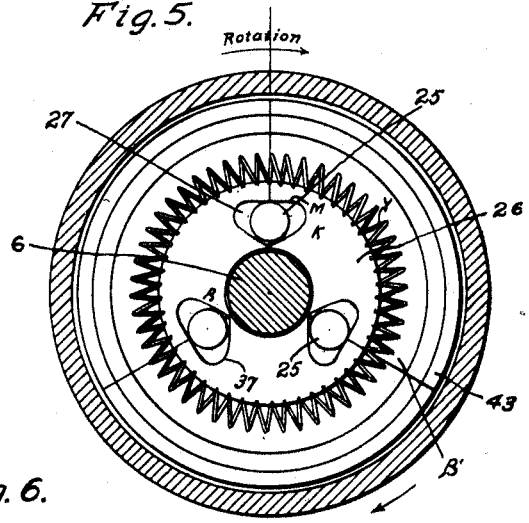
Fig. 5 is an end-view of the mechanism taken along the line V—V of Fig. 4.

The action of the device may be better understood upon consideration of Fig. 8, wherein the reference numerals are the same as in Figs. 2 and 5. Considering clockwise rotation of the rotor and the weight 26, for example, a line 44 may be drawn between the junction of the pin 25 and the notch 27, and the leading edge 43 of the weight. This line 44 represents the line of force, driving line, or pressure line between the driving pin and the contacting point between the weight and the bell, and is, therefore, representative of the linkage employed in driving the bell and the driven machine.

In Figs. 2 and 8, the point of contact between the pin 25 and the notch 27 of the weight-member is somewhat idealized, in the illustration of the line of attack 44. This point of contact is illustrated in these figures as if it were a single point of contact between the pin 25 and the rear sloping inner face 37 of the notch 27. It may frequently happen, however, that the angle $a$ between the face 37 and the line of attack 44 is sufficiently less than 90° so that the angular difference (90°−$a$) is greater than the angle of friction between the pin 25 and the material of the face 37, so that an inwardly directed force will be applied to the rear end of the weight-segment, sufficient to overcome the difference between the centrifugal force and the spring pressure, and thus to cock the weight-segment as shown in Fig. 3. In this position, the top of the notch 27 rests on the top of the pin 25, bearing on the same with more or less pressure depending on the condition of the friction surfaces between the pin and the notch. This produces two points of contact between the pin and the weight-segment, so that, at times, the effective center of these two contact-points, making allowances for the different angles and pressures at the two points, may be closer to the center of the pin 25 than the point shown in Figs. 2 and 8, while at other times, or under other conditions of operation, the line of attack may be positioned substantially as indicated in Figs. 2 and 8.

The inner wall 37 of the notch 27 slopes in the direction of rotation with respect to the driving line 44 at an angle, termed the wedging angle $a$ (Fig. 8), which should be less than 90° with respect to the driving force 44. Thus, when the speed of the weight reaches a given value and the weight flies outwardly, contact of the weight with the bell causes the former to be driven backwardly against the pin 25. Since the slope in the direction of rotation of the inner wall of the notch is less than 90° with respect to the pressure line 44, the trailing portion of the weight slides inwardly until the weight assumes a "cocked" position such as shown in Fig. 3, with its leading portion in contact with the bell and with the inner wall of the V-shaped notch in contact with the driving pin. The weight then becomes wedged between the pin and the bell in the "cocked" position. It is this position which leads to the "bumping" action which is so particularly desirable for starting a driven machine under load.

It has been found that the coefficient of friction of the lining material and the average effective value of the angle $\beta$, termed the angle of attack, between the pressure line and a normal to the contacting surfaces at the point where they are cut by said line, bear a close relation. For instance, with the particular contour of the weight shown in Fig. 8, the angles $\beta'$ between lines normal to the contacting surfaces of the weight and the bell at successive points, representing radial pressure of the weight against the bell, and lines representing the pressure caused by the pin 25 driving the weight toward the bell at various points, vary from 0°, at a radial line passing through the pin, to a maximum, say, of 19° 42' at a position approximately 64° 23' from the radial line passing through the pin, and then decreases to a value, say, of 15° 55', or approximately 16°, at a position at the leading edge of the weight.

Suppose a molded lining material, such as that commonly used for brake lining, is utilized for lining the weights. A material may be chosen whose average coefficient of sliding friction will be approximately .4. The coefficient of friction is higher when the material is hot than when it is cold, so that this coefficient will be somewhat less than .4 when the motor first starts, or first encounters a severe load. The average angle of friction, which is the angle whose tangent is the average coefficient of friction, in this case .4, is approximately 22°.

In some forms of embodiment of my invention, this angle of friction may be intermediate between the leading-edge angle of attack and the maximum angle of attack, such as, say 22° for the angle of friction, 16.6° for the leading-edge angle of attack, and 24.5° for the maximum angle of attack, the latter occurring at approximately the middle of the weight.

If the coefficient of sliding friction did not increase during engagement of the weight with the bell, and if the average effective angle of attack $\beta$ were greater than the angle of friction, or 22°, the weights would slide and never grab. If the average effective angle of attack were less than the angle of friction, in this case 22°, the friction surfaces could not slide, but would lock in engagement. The average effective angle of attack under moderate or heavy load conditions may be defined as the angle between the line of attack which connects the point of contact between the driving pin and the weight and the effective center of friction of the contacting portion of the friction surfaces and the normal at said effective center of friction. The said contacting portion of the friction surfaces would be a straight line if the materials did not yield, but actually the friction material at the leading edge of the weight becomes compressed and worn, so that contact is made over an area extending back approximately ⅜ inch from the tip.

Thus, in the particular construction shown, to which I am not necessarily limited, contact is made between the leading tip of the segmental weight and the cylindrical bell. This is always a gripping engagement because the angle of attack is less than the angle of friction.

If the load on the driven member is sufficiently great to reduce the speed of the motor to the point when the garter spring should move the weights inwardly out of contact with the bell, something happens, such as a vibration, or a momentary pulsation in the transmitted torque, to permit this action to take place. The motor, now being free of the load, immediately accelerates until the weights again grip the bell, and if the bell requires an excessive torque, another "bump" is delivered to it, and so on, until the torque required to drive the bell is within the capacity of the motor.

Friction due to sliding, causes an increase in the temperature of the surfaces, which, if not destructively high, ordinarily causes an increase in the coefficient of friction, and this phenomenon may be utilized, by a proper selection of material, to cause the weights to slide until heated to a critical temperature when they would engage with a series of bumps. In other words, with a leading-edge angle of attack of approximately 16°, the friction material could be selected to have an angle of friction less than 16° when cold, but more than 16° when hot, corresponding to a coefficient of friction equal to tan 16°, or approximately .3. However, fewer refinements of construction and operation are required if the construction is so designed that the weights hammer lightly when cold and their blows increase in vigor as the temperature due to friction increases, in other words, if the angle of friction is slightly greater than the leading-edge angle of attack, when the friction-material is cold, and greater yet, when the friction-material is hot.

The values of the local angles of attack, indicated by $\beta'$ in Fig. 8, are workable values. These values of $\beta'$ are not obligatory, provided that a proper relation is maintained between the average effective value of $\beta'$ and the coefficient of friction of the friction material facing the outer surfaces of the weights. Thus, with the proportionality of the parts shown in Fig. 2, both mathematical analysis and actual measurement show that the maximum angle $\beta'$ is about 17° 55' and occurs at a point situated about 72° 30' from the radial line passing through the pin, at the rear edge of the weight, whereas the leading-edge angle of attack is 15° 47'.

As previously pointed out, the cold coefficient of friction may be sufficiently low to cause little or no gripping, under moderate load conditions, but increasing to a higher value, when hot, causing violent gripping or bumping. In general, the severity of the jolts delivered by my clutch-motor may be increased either by increasing the coefficient of friction, if the design of the weight is held constant, or by redesigning the weight to secure a decrease in the distance between the driving pins and the center axis of the shaft, and consequently a decrease in the initial angle of attack at the leading edge of the weight.

Figure 7:
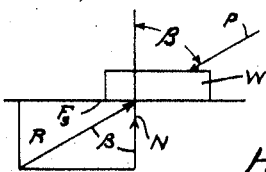
Fig. 7 is a diagrammatic representation of the action of the forces during operation of the mechanism.

Referring particularly to Fig. 7, the surface of the bell may be considered as a horizontal plane and the weight 26 as an object W resting on the plane; the pressure of the pin 25, acting against the weight, may be considered as a force P tending to push the weight along the horizontal plane. If R equals the force opposing P, the force R may be resolved into two components, a force N, normal to the surfaces in contact, and a force $F_s$ termed the frictional resistance which acts in the plane of the contacting surfaces and tends to retard motion of the weight. Applying the force diagram to my clutch mechanism, if the resistance to rotation, or load of the driven device (R), is greater than the frictional resistance $F_s$, of the rubbing surfaces, the rotor speed will drop until the clutch disengages, if equal to, or less than, the frictional resistance, it will grip and carry the load.

The load may cause the motor and weights to slow down, but if it is not so great as to reduce the speed of the system below a certain minimum value represented by line 53 (Fig. 6), because of the wedged condition of the weights, the transmission mechanism remains in engagement and continues to drive the load.

If, however, the load is sufficiently great, the speed of the rotating parts is reduced to the point where the garter spring becomes operative to move the weights inwardly from their wedged position and the clutch becomes disengaged. When this takes place, the motor and weights again speed up, and a speed (line 54, Fig. 6) is reached higher than the speed at which the transmission mechanism became disengaged. In other words, the transmission mechanism, once engaged, may be slowed down to a speed considerably below the speed at which it first became engaged.

Figure 6:
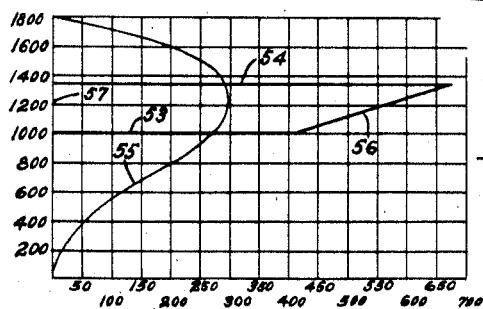
Fig. 6 is a graphic representation of the changes in torque and speed which take place during operation of the mechanism.

In Fig. 6 is illustrated graphically the effect secured by my transmission mechanism. The speed-torque curve of a single-phase squirrel-cage motor (with the usual starting winding) is shown as the line 55. For example, suppose the weights and springs are proportioned and arranged so that the rotor and weights attain a speed of 1350 R. P. M. before engagement occurs. When this speed is attained, the torque (line 54) applied to the driven machine is considerably greater than the torque of the rotor alone because of the "hammer" (inertia effect) or "bump" with which the weights engage. If the driven device is partially locked, the speed and torque of the rotor are decreased until the weights drop out of engagement, the torque at this time having the value indicated, for example, by the line 53. This drop in speed and torque is indicated by the line 56. The torque drops at the same time as the drop in speed because the momentum of the rotor and weights is being absorbed and because the motor is operating at a lower speed. At a certain value of speed, such as 1000 R. P. M., the centrifugal force of the weights having decreased, the garter spring becomes operative to move the weights inwardly and the mechanism releases. The rotor and weights then begin to speed up (line 57) until the centrifugal effect causes the weights to fly out and suddenly grab to repeat the process outlined until the driven machine is brought up to speed.

The cycle of operation under conditions of heavy load on the driven machine, may be repeated again and again so that a succession of "hammer blows" or "bumps" are delivered to the bell and driven machine to cause them to start under a heavy load.

It is to be noted that the line of thrust or driving force in my device acts at an angle of less than 90° with respect to the inner surface of the drum so that a wedging action is secured. This wedging action is particularly desirable as, by reason of it, the "bumping" action above-noted is secured or, at least, greatly accentuated.

It is apparent that, owing to the symmetrical contour of the weights and driving pins, the device is two-directional, that is, will drive properly in either direction. The starting current for the rotor alone is low and the starting current for the motor as a whole is low and is approximately the same irrespective of loads, since the current in the motor winding has reached a relatively low value before the clutch engages. When the driving device is started against an ordinary load, the weights may slide and give only a moderate shock to the driven mechanism. If the motor is starting against a heavy overload or the driven device becomes suddenly overloaded, the weights may slide for a few revolutions and then begin a series of blows which increase in value to a certain maximum and which are sufficient to start the driven machine against ordinary over-load conditions.

Although I have described, by way of example, the present preferred embodiments of my invention, it is apparent that many modifications may be made by those skilled in the art without departing from the spirit and scope of my invention as set forth in the appended claims.

I claim as my invention:

1. A driving member provided with pins having their axes disposed parallel to the axis of rotation of said member, a plurality of segmental weights each provided with notches in the two opposite sides thereof, two adjoining notches being operatively engaged with each pin, a driven member including a bell, the weights being provided with annular recesses on lateral faces and a coiled spring disposed in the recess.

2. A centrifugal mechanical clutch-connection comprising a rotatably mounted cylindrical cup-shaped driven-member, a plurality of segmental weights mounted therein and having outer friction surfaces adapted to engage the inner friction surface of said cylindrical driven-member, a concentrically mounted rotatable driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the leading-edge angle of attack is less than the angle of friction at the leading edge of the contacting friction surface of each weight, and the maximum angle of attack is greater than the angle of friction, at some intermediate point near the middle of the friction surface of each weight, the angle of attack being defined as the angle between a line of attack which connects the point of contact between the driving pin and the weight and the point under consideration on the friction surfaces, and a line connecting said last-mentioned point to the axis of rotation, the coefficient of friction of the materials of the friction surfaces increasing with their temperature.

3. An indirect mechanical connection comprising a rotatably mounted cylindrical cup-shaped driven-member, a plurality of segmental weights mounted therein and having outer friction surfaces adapted to engage the inner friction surface of said cylindrical driven-member, a concentrically mounted rotatable driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the leading-edge angle of attack is less than the angle of friction at the leading edge of the contacting friction surface of each weight, and the maximum angle of attack is greater than the angle of friction, at some intermediate point near the middle of the friction surface of each weight, the angle of attack being defined as the angle between a line of attack which connects the point of contact between the driving pin and the weight and the point under consideration on the friction surfaces, and a line connecting said last-mentioned point to the axis of rotation.

4. An indirect mechanical connection comprising a rotatably mounted cylindrical cup-shaped driven-member, a plurality of segmental weights mounted therein and having outer friction surfaces adapted to engage the inner friction surface of said cylindrical driven-member, a concentrically mounted rotatable driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the leading-edge angle of attack is less than the angle of friction at the leading edge of the contacting friction surface of each weight, and the maximum angle of attack is greater than the angle of friction, at some intermediate point near the middle of the friction surface of each weight, the angle of attack being defined as the angle between a line of attack which connects the point of contact between the driving pin and the weight and the point under consideration on the friction surfaces, and a line connecting said last-mentioned point to the axis of rotation, and further characterized by the fact that the surface of each weight at the point of its engagement with the pin is inclined at less than 90° with respect to the leading-edge line of attack, so as to tend to force said point of engagement inwardly.

5. An indirect mechanical connection comprising a rotatably mounted cylindrical cup-shaped driven-member, a plurality of segmental weights mounted therein and having outer friction surfaces adapted to engage the inner friction surface of said cylindrical driven-member, a concentrically mounted rotatable driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the maximum angle of attack is greater than the angle of friction, at some intermediate point near the middle of the friction surface of each weight, the angle of attack being defined as the angle between a line of attack which connects the point of contact between the driving pin and the weight and the point under consideration on the friction surfaces, and a line connecting said last-mentioned point to the axis of rotation.

6. An indirect mechanical connection comprising a rotatably mounted cylindrical cup-shaped driven-member, a plurality of segmental weights mounted therein and having outer friction surfaces adapted to engage the inner friction surface of said cylindrical driven-member, a concentrically mounted rotatable driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the maximum angle of attack is greater than the angle of friction, at some intermediate point near the middle of the friction surface of each weight, the angle of attack being defined as the angle between a line of attack which connects the point of contact between the driving pin and the weight and the point under consideration on the friction surfaces, and a line connecting said last-mentioned point to the axis of rotation, and further characterized by the fact that the surface of each weight at the point of its engagement with the pin is inclined at less than 90° with respect to the leading-edge line of attack at the leading edge of the contacting friction surface of each weight, so as to tend to force said point of engagement inwardly.

7. An indirect mechanical connection comprising a rotatably mounted cylindrical cup-shaped driven-member, a plurality of segmental weights mounted therein and having outer friction surfaces adapted to engage the inner friction surface of said cylindrical driven-member, a concentrically mounted rotatable driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the average effective angle of attack, near the leading edge, is less than the average angle of friction of the friction materials, the average effective angle of attack being defined as the angle between a line of attack which connects the point of contact between the driving pin and the weight and the effective center of friction of the contacting portions of the friction surfaces and the normal at said effective center of friction.

8. An indirect mechanical connection comprising a rotatably mounted cylindrical cup-shaped driven-member, a plurality of segmental weights mounted therein and having outer friction surfaces adapted to engage the inner friction surface of said cylindrical driven-member, a concentrically mounted rotatable driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the average effective angle of attack, near the leading edge, is less than the average angle of friction of the friction materials, the average effective angle of attack being defined as the angle between a line of attack which connects the point of contact between the driving pin and the weight and the effective center of friction of the contacting portions of the friction surfaces and the normal at said effective center of friction, at least one of the friction surfaces being lined with a friction material having a coefficient of friction, with respect to the other friction surface, which increases as the material heats.

9. In an indirect mechanical connection comprising a rotatably mounted cylindrical cup-shaped driven-member, a plurality of segmental weights mounted therein and having outer friction surfaces adapted to engage the inner friction surface of said cylindrical driven-member, a concentrically mounted rotatable driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the average effective angle of attack, near the leading edge, is less than the average angle of friction of the friction materials, the average effective angle of attack being defined as the angle between a line of attack which connects the point of contact between the driving pin and the weight and the effective center of friction of the contacting portions of the friction surfaces and the normal at said effective center of friction, at least one of the friction surfaces being lined with a friction material having a coefficient of friction of approximately .3 to .4 with respect to the material of the other friction surface.

10. An indirect mechanical connection comprising a rotatably mounted cylindrical cup-shaped driven-member, a plurality of segmental weights mounted therein and having outer friction surfaces adapted to engage the inner friction surface of said cylindrical driven-member, a concentrically mounted rotatable driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the average effective angle of attack, near the leading edge, is less than the average angle of friction of the friction materials, the average effective angle of attack being defined as the angle between a line of attack which connects the point of contact between the driving pin and the weight and the effective center of friction of the contacting portions of the friction surfaces and the normal at said effective center of friction, and further characterized by the fact that the surface of each weight at the point of its engagement with the pin is inclined at an angle of somewhere around 90° with respect to the leading-edge line of attack at the leading edge of the contacting surface of each weight.

11. A centrifugal mechanical clutch-connection comprising a rotating driving member, a concentrically mounted cylindrical cup-shaped rotating driven member, a plurality of segmental weights mounted therein and having outer friction surfaces adapted to engage the inner friction surfaces of said cylindrical driven-member, said driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the average effective angle of attack is less than the average angle of friction of the friction materials, under normal, steady-state, full-load conditions, the average effective angle of attack being defined as the angle between a line of attack which connects the point of contact between the driving pin and the weight and the effective center of friction of the contacting portions of the friction surfaces and the normal at said effective center of friction, and further characterized by the fact that the surface of each weight at the point of its engagement with the pin is inclined at less than 90° with respect to the leading-edge line of attack at the leading edge of the contacting surface of each weight, so as to tend to force said point of engagement inwardly.

12. A centrifugal mechanical clutch-connection comprising a rotating driving member, a concentrically mounted cylindrical cup-shaped rotating driven member, a plurality of segmental weights mounted therein and having outer friction surfaces adapted to engage the inner friction surfaces of said cylindrical driven-member, said driving member carrying a plurality of axially extending driving-pins engaging said segmental weights, spring-means for holding the weights inwardly, out of contact with said cylindrical driven-member, at low speeds, the materials of the friction surfaces having a coefficient of friction of approximately .3 to .4, and the leading-edge angle of attack being less than the angle of friction, the leading-edge angle of attack being defined as the angle between the leading-edge line of attack which connects the contacting surface of any driving pin and its associated weight to the leading-edge friction surface of the weight, at its point of engagement with said cup-shaped driven member, and the normal at said point of engagement.

13. A centrifugal mechanical clutch-connection comprising a rotating driving member, a concentrically mounted cylindrical cup-shaped rotating driven member, a plurality of segmental weights mounted therein and having outer friction surfaces adapted to engage the inner friction surfaces of said cylindrical driven-member, said driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the leading-edge angle of attack is less than the angle of friction, the leading-edge angle of attack being defined as the angle between the leading-edge line of attack which connects the contacting surface of any driving pin and its associated weight to the leading-edge friction surface of the weight, at its point of engagement with said cup-shaped driven member, and the normal at said point of engagement.

14. A centrifugal mechanical clutch-connection comprising a rotating driving member, a concentrically mounted cylindrical cup-shaped rotating driven member, a plurality of segmental weights mounted therein and having outer friction surfaces adapted to engage the inner friction surfaces of said cylindrical driven-member, said driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the leading-edge angle of attack is less than the angle of friction, the leading-edge angle of attack being defined as the angle between the leading-edge line of attack which connects the contacting surface of any driving pin and its associated weight to the leading-edge friction surface of the weight, at its point of engagement with said cup-shaped driven member, and the normal at said point of engagement, said contacting surface of the driving pin and weight being at an angle of approximately 90° with respect to said leading-edge line of attack.

15. An indirect mechanical connection comprising a rotatably mounted cylindrical cup-shaped driven-member, a plurality of segmental weights mounted therein and having outer friction surfaces adapted to engage the inner friction surface of said cylindrical driven-member, a concentrically mounted rotatable driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the leading-edge angle of attack is less than the angle of friction at the leading edge of the contacting friction surface of each weight, the angle of attack being defined as the angle between a line of attack which connects the point of contact between the driving pin and the weight and the point under consideration on the friction surfaces, and a line connecting said last-mentioned point to the axis of rotation, and further characterized by the fact that the surface of each weight at the point of its engagement with the pin is inclined less than 90° with respect to the leading-edge line of attack, so as to tend to force said point of engagement inwardly.

16. A rotatable driving device including pivots, weights provided with surfaces for engaging the pivots, the surfaces being sloped at an angle of less than 90° with the line of attack so as to cause wedging of the weights, and said surfaces engaging the pivots being located at the trailing side of the weights, the angle of attack at the leading edge of each weight being less than the angle corresponding to the average coefficient of sliding friction of the contacting materials at the leading edge, said angle of attack being the angle between the line of attack and the normal to the friction surface of the contacting materials at the leading edge, and said line of attack being the line connecting the effective center of the friction surface of the contacting materials at the leading edge and the junction between the pivot and the surface which the pivot engages.

17. A centrifugal mechanical clutch-connection comprising a rotating driving member, a concentrically mounted cylindrical cup-shaped rotating driven member, a plurality of segmental weights mounted therein and having outer friction surfaces adapted to engage the inner friction surfaces of said cylindrical driven-member, said driving member carrying a plurality of axially extending driving-pins engaging said segmental weights, spring-means for holding the weights inwardly, out of contact with said cylindrical driven-member, at low speeds, the materials of the friction surfaces having a coefficient of friction such that the leading-edge angle of attack is approximately the same as the angle of friction when the friction surfaces are cold, the leading-edge angle of attack being defined as the angle between the leading-edge line of attack which connects the contacting surface of any driving pin and its associated weight to the leading-edge friction surface of the weight, at its point of engagement with said cup-shaped driven member, and the normal at said point of engagement, at least one of the friction surfaces being lined with a friction material having a coefficient of friction, with respect to the other friction surface, which increases as the material heats.

18. A centrifugal mechanical clutch-connection comprising a rotating driving member, a concentrically mounted cylindrical cup-shaped rotating driven member, a plurality of segmental weights mounted therein and having outer friction surfaces adapted to engage the inner friction surfaces of said cylindrical driven-member, said driving member carrying a plurality of axially extending driving-pins engaging said segmental weights, spring-means for holding the weights inwardly, out of contact with said cylindrical driven-member, at low speeds, the materials of the friction surfaces having a coefficient of friction which increases as the temperature increases, and such that the angle of friction is less than the effective angle of attack when the friction surfaces are cold, and greater than the effective angle of attack when the friction surfaces are hot, the effective angle of attack being defined as the angle between a line of attack which connects the point of contact between the driving pin and the weight and the effective center of friction of the contacting portions of the friction surfaces and the normal at said effective center of friction.

HARRY D. ELSE.